Feb. 5, 1924.

J. J. SMITH

VALVE FITTING

Filed May 3, 1921

1,482,948

INVENTOR

James J. Smith.

WITNESS

F. J. Hartman

BY Robert M. Barr.

ATTORNEY

Patented Feb. 5, 1924.

1,482,948

UNITED STATES PATENT OFFICE.

JAMES J. SMITH, OF PHILADELPHIA, PENNSYLVANIA.

VALVE FITTING.

Application filed May 3, 1921. Serial No. 466,391.

*To all whom it may concern:*

Be it known that I, JAMES J. SMITH, a citizen of the United States, and a resident of the city of Philadelphia, county of Philadelphia, State of Pennsylvania, have invented certain new and useful Improvements in Valve Fittings, of which the following is a specification.

Some of the objects of the present invention are to provide an improved discharge valve fitting for ice cream cabinets, tanks, and other liquid containing receptacles; to provide a valve fitting the parts of which are incorrodible; to provide a valve fitting arranged to be readily cleaned and cleared of obstructions so that a free flow is maintained; to provide a valve fitting so constructed as to reduce repairs to a minimum and eliminate loss of time incident to the use of ordinary valve parts; to provide a leak-proof valve fitting comprising parts formed as a unitary structure whereby assembling and installing the fitting is readily accomplished, and to provide other improvements as will hereinafter appear.

Figure 1:
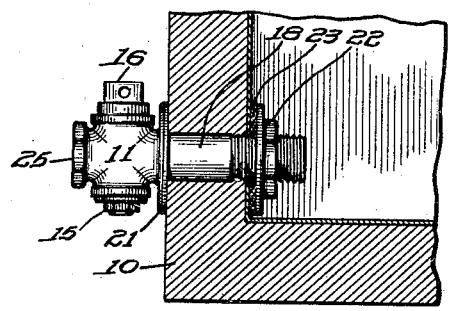
Figure 2:
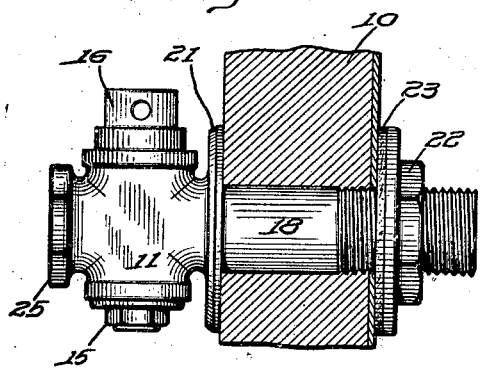
Figure 3:
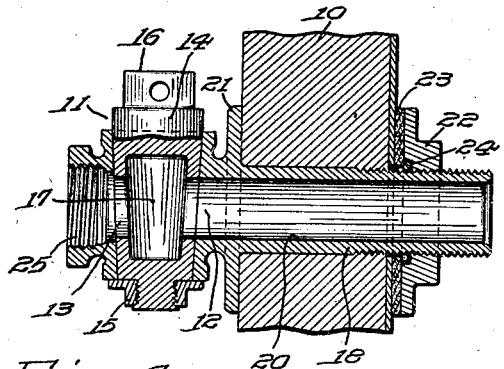
Figure 4:
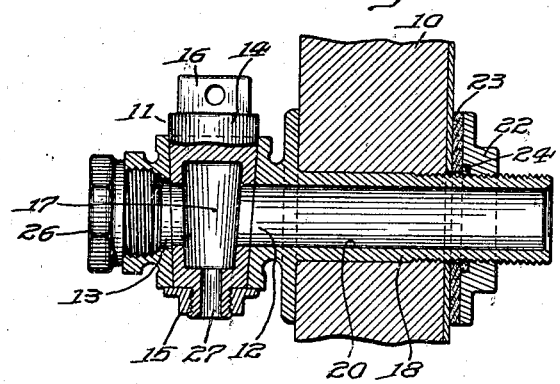

In the accompanying drawing Fig. 1 represents a sectional elevation of a portion of a receptacle equipped with a valve fitting embodying one form of the present invention; Fig. 2 represents a side elevation of the form of fitting shown in Fig. 1; Fig. 3 represents a sectional elevation of the same; and Fig. 4 represents a sectional elevation of another form of the invention.

Referring to the drawings, one form of the present invention is shown in Fig. 1 as applied to a cabinet 10 which serves as a packing receptacle for ice cream containers, though it will be understood the invention may be applied to any other receptacle or tank from which liquid is to be drawn off from time to time.

The device of the invention in the form shown in Figures 1, 2 and 3 consists of a body 11 of brass or any other metal or alloy which is not subject to corrosion when exposed to the action of a liquid such as brine or any other solution the action of which tends to eat away iron fittings.

For the purpose of serving as a means for draining or drawing off liquid from the receptacle to which the body 11 is attached, the body 11 is of hollow construction and has an inlet port 12 at one side and an outlet port 13 at the opposite side, the two ports 12 and 13 being coaxially arranged to permit free unobstructed flow of liquid.

In order to control the flow of liquid through the body 11, a rotatable valve plug 14 is provided, preferably of the tapered type, which extends transversely through the body 11 seating snugly upon a finished bored portion of the body 11. One protruding end of the plug 14 is threaded to receive a fastening nut 15, while the opposite end has a rectangular stem 16 to receive a wrench or other tool. These details may be varied without departing from the invention, as will be understood. The plug 14 is provided with a transverse passage 17 which is arranged to be brought into register with the inlet port 12 and outlet 13 to thereby establish communication between them, to permit flow of liquid through the body 11. When the plug 14 is turned the passage 17 moves out of register with the aforesaid ports and flow of liquid is completely cut off.

As a means for securing the body 11 to the cabinet 10 or other receptacle, in communication therewith, it is provided with an integral, tubular extension 18, the bore 20 of which communicates with the inlet port 12 at one end, and the interior of the cabinet 10 at its other end. The length of the extension 18 is such as to pass through the wall of the cabinet 10, and the construction is such that a snug fit is made with the opening in the wall to prevent leakage through the joint.

In order to rigidly secure the body 11 to the cabinet 10 in leak-proof relation, a flange 21 is formed integral with the outer end portion of the extension 18, while the inner end portion of the extension 18 is threaded to receive a flanged nut 22. Between the flange 21 and the nut 22 there is a packing ring 23 of leather or other suitable material, encircling the extension 18 and arranged to seat against the inner wall of the cabinet 10. This packing ring 23 prevents leakage by way of the threaded portion of the extension 18 and to make this entirely effective for this purpose, the abutting face of the flanged nut 22 is provided with a circumferential groove 24 into which abutting portions of the ring 23 are forced under the pressure applied in drawing the nut 22 tight.

The discharge side of the body 11 is preferably provided with an internally threaded coupling head 25, so that a length of pipe can be secured to the body 11 to conduct the discharged liquid to a suitable point. This is an optional arrangement, however, as the body 10 can discharge directly through the head 25 into a receptacle placed below the discharge opening.

In the form of the invention shown in Fig. 4, provision is made for a direct vertical discharge from the body 11 and in this construction the coupling head 25 is closed by a plug 26 while the valve plug 14 has an axially disposed conduit 27 communicating at its inner end with the passage 17 and at its outer end in communication with the atmosphere.

The operation of the valve will be obvious as turning the plug 14 to one position establishes communication between the ports 12 and 13 and turning it to another position closes the valve and cuts off such communication. It should be noted, however, that the open ended head 25 permits ready access to the interior of the body 11 and extension 18 for cleaning purposes. Thus, for example, where ordinary fittings are used with an ice cream cabinet, the salt in the discharge water collects about the inner end thereof to such an extent as to obstruct the free flow of the water, and frequently the outlet of such fittings becomes so clogged as to entirely prevent flow therethrough. Should this occur in the use of the fitting of the present invention, the obstruction can be at once removed by opening the valve 14 and inserting a suitable implement, by way of the head 25, through the body 11 and extension 18 whereby salt or other collected matter is at once dislodged and the fitting again functions in the usual manner. By this construction the ordinary delays and loss of time incident to emptying the cabinet and removing the fitting are entirely eliminated.

Furthermore, repair and replacement of valve fittings damaged by corrosion are done away with and a complete unitary structure is provided which effectively withstands the action of brine or other corroding solutions whereby long life and continuous operation is insured.

While but two forms have been shown in which this invention may be embodied, it is to be understood that the invention is not limited to any specific construction, but might be applied in various forms without departing from the spirit of the invention or the scope of the appended claims.

Having thus described my invention, I claim:

1. A drain faucet for ice cream containers and the like, comprising a one piece body having a flange to cooperate with the outer wall of the container, a packing cooperating with the inner wall of the container, a passage alined with the faucet passage, and a rotary plug for regulating the flow from the faucet passage.

2. A drain faucet for ice cream containers and the like, comprising a one piece body having a flange to cooperate with the outer wall of the container, a packing cooperating with the inner wall of the container, a passage alined with the faucet passage, and a rotary plug for regulating the flow from the faucet passage, the rotary plug being provided with a transverse clean-out opening and an axial discharge opening, said alined passage serving as a clean-out opening.

Signed at Philadelphia, in the county of Philadelphia, and State of Pennsylvania, this 27th day of April, 1921.

JAMES J. SMITH.